United States Patent

Akedo et al.

[11] Patent Number: 5,884,670
[45] Date of Patent: Mar. 23, 1999

[54] SYNTHETIC RESIN TUBE AND PRODUCING METHOD THEREOF

[75] Inventors: Youichi Akedo; Seiji Shiga; Tetsuya Inagake; Shoji Hattori; Yoshiki Yoshitomi, all of Kakegawa, Japan

[73] Assignee: Tigers Poymer Corporation, Toyonaka, Japan

[21] Appl. No.: 851,953

[22] Filed: May 6, 1997

[51] Int. Cl.[6] .................................................. F16L 11/16
[52] U.S. Cl. .......................... 138/119; 138/122; 138/144; 264/173.17; 264/209.7; 264/211.12; 264/344
[58] Field of Search .................................. 138/144, 101, 138/116, 117, 119, 122, 135, 136, 153; 264/171.11, 172.1, 173.17, 209.7, 211.12, 344

[56] References Cited

U.S. PATENT DOCUMENTS

| | | | |
|---|---|---|---|
| 3,957,084 | 5/1976 | Jung | 138/136 |
| 4,800,928 | 1/1989 | Kanao | 138/144 |
| 4,824,502 | 4/1989 | Nagayoshi et al. | 138/122 |
| 4,842,023 | 6/1989 | Whitworth | 138/122 |
| 4,862,924 | 9/1989 | Kanao | 138/122 |
| 4,903,736 | 2/1990 | Baston et al. | 138/122 |
| 5,096,521 | 3/1992 | Schouten | 138/136 |
| 5,769,127 | 6/1998 | Kanao et al. | 138/129 |

*Primary Examiner*—Patrick Brinson
*Assistant Examiner*—James F. Hook
*Attorney, Agent, or Firm*—Burns, Doane, Swecker & Mathis, LLP

[57] ABSTRACT

A synthetic resin tube comprises an internal layer which is made of non-rigid synthetic resin and has a substantially smooth inner circumferential surface, and an external layer which is formed by winding a strip made of rigid synthetic resin around an outer circumferential surface of the internal layer overlapping winds of the strip and connecting the external layer with the internal layer, a cross section of the strip being S-shaped. When the external layer is formed, adjacent winds of the strip are connected temporarily and capable of being disconnected. After the external layer is formed, flexibility can be given to an optional length of the tube by removing the temporary connection among the winds of the strip.

4 Claims, 4 Drawing Sheets

F I G. 1
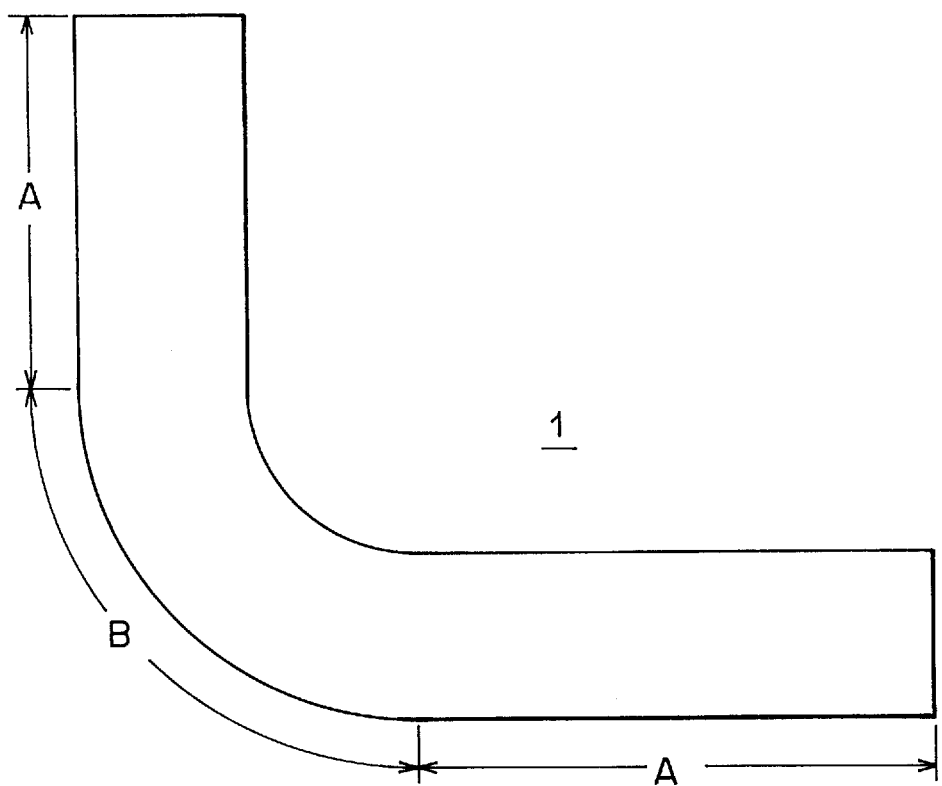

A

B

F I G. 6
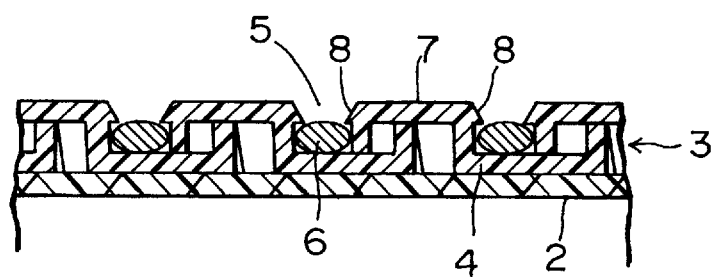
A

SYNTHETIC RESIN TUBE AND PRODUCING METHOD THEREOF

BACKGROUND OF THE INVENTION

1. Field of the invention

The present invention relates to a synthetic resin tube and a producing method thereof, and more particularly to a partially flexible tube which may be used as a drainpipe at a drainage facility of an overhead section of an expressway and a producing method thereof.

2. Description of Related Art

Conventionally, at beams and piers of an overhead section of an expressway, a plurality of straight tubelike drainpipes are used in order to lead rain water which is collected in a drainage tank provided at a road surface to sewerage. These water pipes are provided vertically and horizontally and are connected with each other by suitable connecting equipment.

However, since it is necessary to connect a plurality of straight drainpipes by connecting equipment such as elbows and bends which are suited for the situation of the construction site, the work of pipe arrangement is quite troublesome.

Particularly, when the water pipes are provided at a place which requires many curbs of the pipes, the work of pipe arrangement becomes further complicated, and accordingly, becomes inefficient.

SUMMARY OF THE INVENTION

An object of the present invention is to provide a synthetic resin tube and a producing method thereof, the synthetic resin tube being one tube body which has a straight section with limited flexibility and a flexible curb section at optional portions in its length direction.

In order to attain the object, a synthetic resin tube according to the present invention comprises an internal layer which is made of non-rigid synthetic resin and has a substantially smooth inner circumferential surface, and an external layer which is made by winding a rigid synthetic resin strip with an S-shaped cross section around an outer circumferential surface of the internal layer overlapping winds of the strip, the external layer being connected to the internal layer, and when the external layer is formed, the winds of the strip are mutually connected temporarily to be capable of being disconnected.

In the synthetic resin tube, flexibility can be given to the tube only at a portion desired to be flexible according to the condition of the construction site by removing the temporary connections among the winds of the strip. Thus, the rest of the tube is maintained straight. That is, the tube of the present invention can be processed to a curbed tube suitable to the construction site, thereby eliminating the necessity of preparing an elbow or a bend separately. Accordingly, the pipe arrangement work becomes easy and also can be done in short time.

The synthetic resin tube further comprising, besides the internal layer and the external layer, a coil which is provided removably in a concave portion formed spirally in an axis direction at the outer surface of the external layer. Flexibility of the synthetic resin tube is limited by fitting the coil in the concave portion, and the tube gains flexibility by removing the coil. The coil is removed according to the condition of the construction site.

Furthermore, the synthetic resin tube according to the present invention is produced in the following processes. Such processes comprise a process for extruding a non-rigid synthetic resin tape, and at the same time, winding the tape spirally connecting side end portions of the wound tape mutually to form an internal layer, and a process for, simultaneously with the formation of the internal layer, extruding and winding a rigid synthetic resin strip around the outer circumferential surface of the internal layer spirally over-lapping winds of the strip, the winds of the strip being connected temporary and capable of being disconnected.

Further, in order to fit the coil in the outer surface of the external layer, with or after the formation of the external layer, synthetic resin which is not fused with the external layer by heat is extruded and fitted in the concave portion of the external layer.

BRIEF DESCRIPTION OF THE DRAWINGS

This and other objects and features of the present invention will become apparent from the following description with reference to the accompanying drawings, in which:

FIG. 1 is a schematic view which shows a whole synthetic resin tube of the present invention;

FIG. 6 is a sectional view which shows a straight tube section which is a modified example of the second embodiment.

DETAILED DESCRIPTION OF THE PREFERRED EMBODIMENTS

The description of preferred embodiments according to the present invention is given below, referring to the accompanying drawings.

FIG. 1 is a schematic view which shows a synthetic resin tube 1 which is a first embodiment according to the present invention. In this synthetic resin tube 1, straight tube sections A which have limited flexibility and are not capable of bending and a curbed tube section B which is flexible and is capable of bending are formed successively in a length direction.

Figure 2:
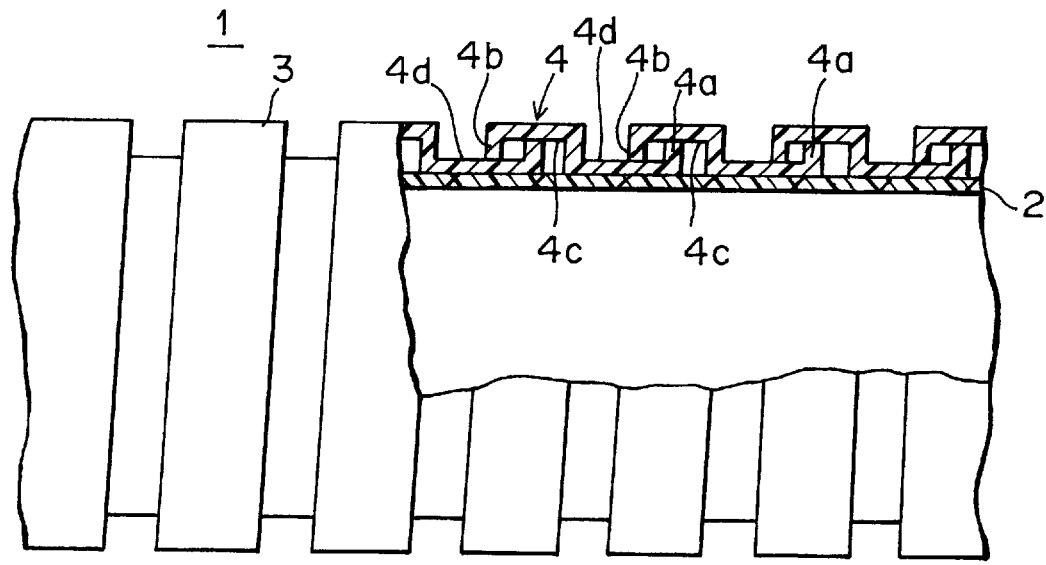
FIG. 2 is a fragmentary sectional view which shows a straight tube section of the synthetic resin tube which is a first embodiment.

As shown in FIG. 2, each of the straight tube section A is composed of an internal layer 2 and an external layer 3. The internal layer 2 is formed by winding a non-rigid synthetic resin tape (for example, non-rigid vinyl chloride resin) spirally and fusing adjacent side end portions of the tape with each other to be formed in a body. The external layer 3 is formed by winding a strip 4 made of rigid synthetic resin (for example, rigid vinyl chloride resin) spirally around an outer circumferential surface of the internal layer 2. The strip 4 is substantially S-shaped in its cross section, and both side ends 4a and 4b of the strip 4 are bent in opposite directions. Adjacent side end portions of the spirally wound strip 4 are overlapped to be formed into a body. An inner circumferential surface of the internal layer 2 is formed substantially smooth, and convex and concave portions are formed at an outer circumferential surface of the external layer 3 along a tube axis direction.

As for the overlap of adjacent side end portions of the wound strip 4, the upward bent end portion 4a is connected temporarily with an inner surface 4c of the convex portion of the next wind of the strip 4, and also, the downward bent end portion 4b is connected temporarily with an outer surface 4d of the concave portion of the previous wind of the strip 4. In this condition, since the strip 4 can not be moved in the tube axis direction, flexibility of the tube 1 can be limited.

The internal layer 2 and the external layer 3 are fused by heat by simultaneously extruding and winding the non-rigid synthetic resin tape and the rigid synthetic resin strip 4 around guide rods (not shown).

When the rigid synthetic resin strip 4 is extruded at approximately 150 degrees Centigrade, the temperature of the contact portions of winds of the strip 4, that is, the contact portion between the upward bent end portion 4a and the inner surface 4c of the convex portion and the contact portion between the downward end bent portion 4b and the outer surface 4d of the concave portion is controlled to be comparatively low, approximately 80 degrees Centigrade by blowing cooled air to the overlapping portions. Thus, adjacent winds of the strip 4 are not fused with each other completely and becomes detachable, while the strip 4 is fused by heat with the non-rigid synthetic resin tape which forms the internal layer 2.

Figure 3:
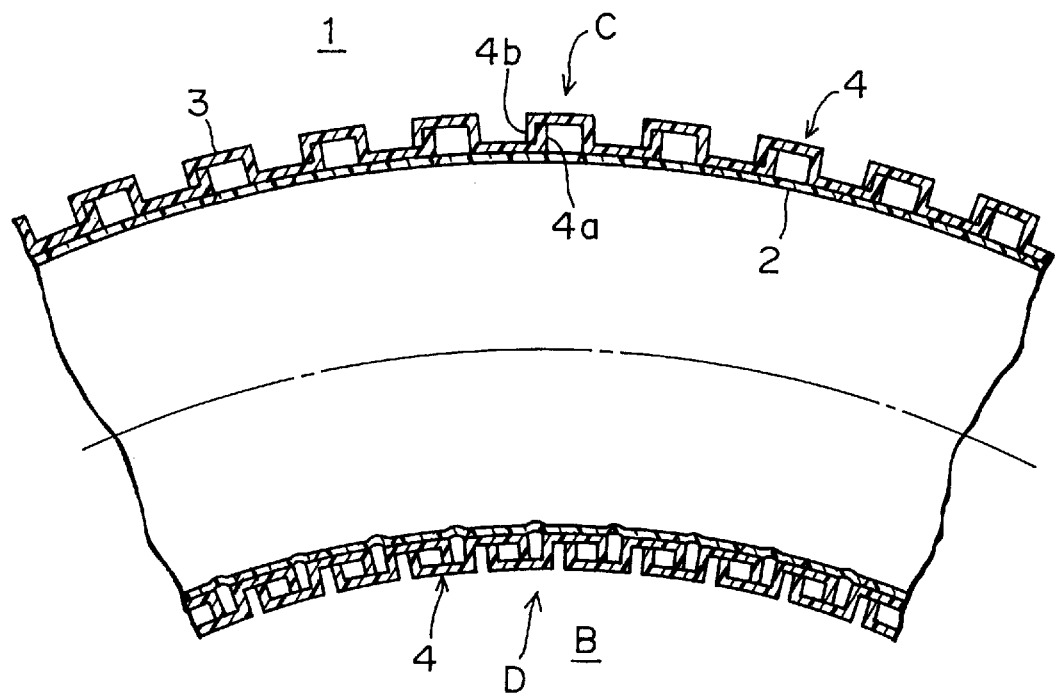
FIG. 3 is a sectional view which shows a curbed section of the synthetic resin tube which is the first embodiment.

FIG. 3 shows the curbed section B. The whole tube 1 is first formed as a straight tube of the structure of the straight tube section A shown in FIG. 2, and then, an optional length of the tube 1 is curbed by detaching the temporarily connecting portions of adjacent winds of the strip 4 by human power or a tool. Thus, the curbed section B is formed. In the curbed section B, the winds of the strip 4 are not fixed by each other and are movable in the tube axis direction.

Therefore, in the curbed section B, the winds of the strip 4 of the outer side C of the curb are extended in the tube axis direction until the upward bent end portion 4a fits with the adjacent downward bent portion 4b. On the other hand, the winds of the strip 4 of the inner side D of the curb are contracted in the tube axis direction, and thereby, the synthetic resin tube 1 is curbed.

Figure 4:
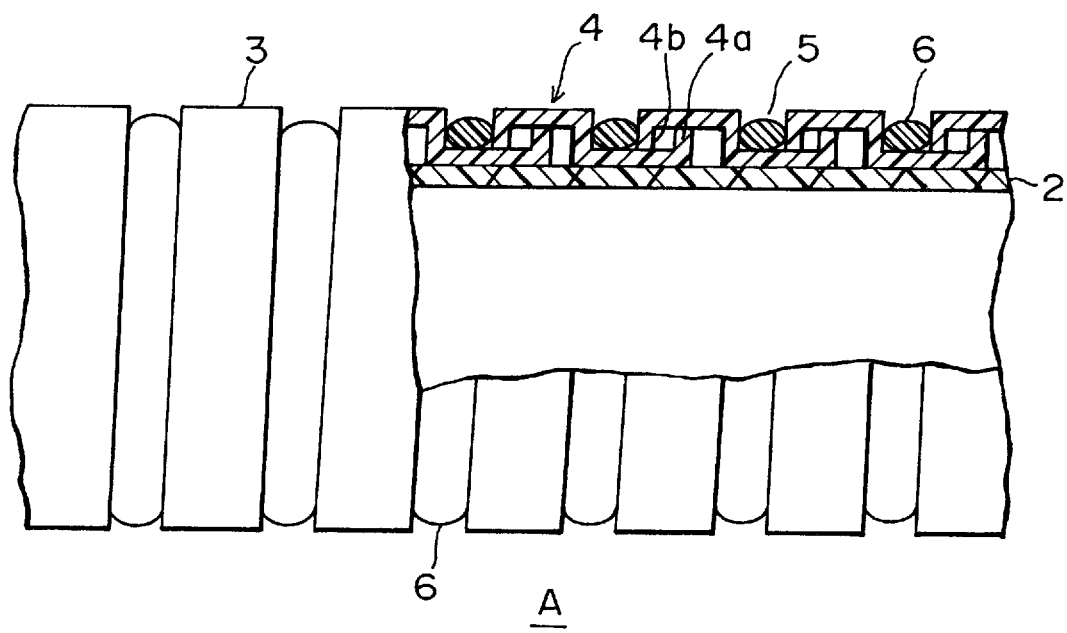
FIG. 4 is a fragmentary sectional view which shows a straight tube section of a synthetic resin tube which is a second embodiment.
Figure 5:
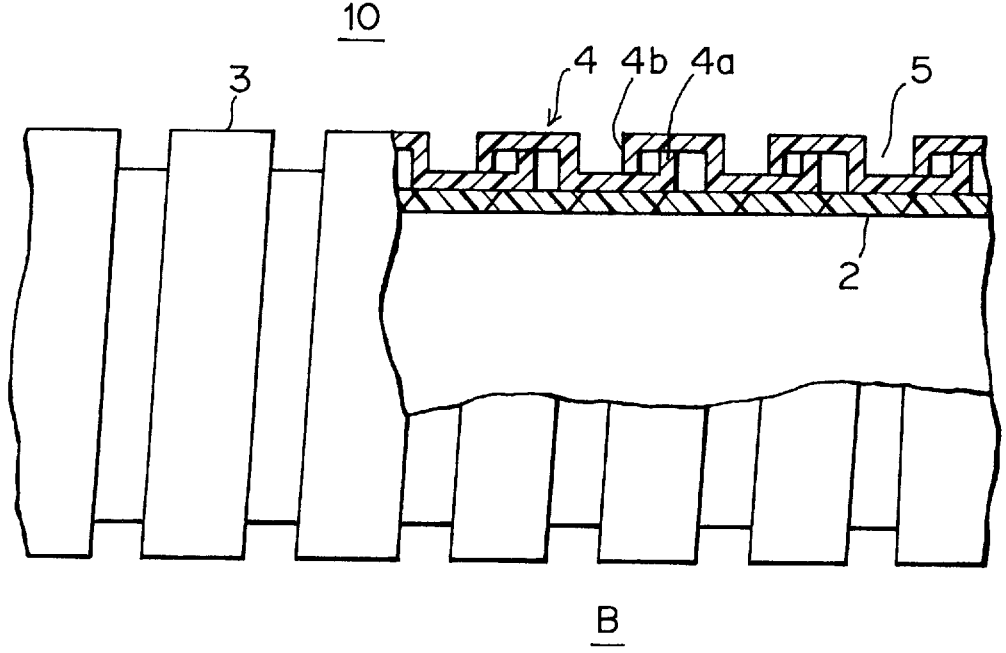
FIG. 5 is a fragmentary sectional view which shows a curbed section of the synthetic resin tube which is the second embodiment.

FIGS. 4 and 5 show a synthetic resin tube 10 which is a second embodiment of the present invention. The internal layer 2 and the external layer 3 have similar structures as those of the first embodiment, and the parts and the portions of these layers 2 and 3 of the second embodiment are provided with the same reference symbols of these of the first embodiment. However, winds of the rigid synthetic resin strip 4 are not connected to each other. For example, while the solid synthetic resin strip 4 is being extruded and wound, cooled air is blown to the overlapping portions between adjacent winds.

In the synthetic resin tube 10, a coil 6 which is extruded simultaneously with the strip 4 filled and fitted in the concave portion 5 of the external layer 3. The coil 6 is made of synthetic resin such as polyolefin which is not fused with the strip 4 by heat. The coil 6 prevents the strip 4 from moving in the tube axis direction. Thereby, the flexibility of the tube 10 is limited, and the tube 10 can not bend.

Since it is enough that the coil 6 is fitted in the concave portion 5 detachably, rigid vinyl chloride resin can be extruded at such a low temperature not to fuse with the strip 4 to form the coil 6. Further, a synthetic resin strip made by extrusion molding or a rigid material other than synthetic resin can be wound spirally and fitted in the concave portion 5 during the forming process of the synthetic resin tube 10.

Furthermore, it is possible that, after the synthetic resin tube which is composed of the internal layer and the external layer is formed, a coil made of one of the above various materials is filled and fitted in a concave portion 5 of the external layer detachably.

FIG. 5 shows the curbed section B. The whole tube 10 is first formed as a straight tube of the structure of the straight tube section A as shown in FIG. 4. Then, an optional length of the coil 6 is removed from the concave portion 5 of the external layer 3 by suitable means such as human power or a tool, and thereby, the strip 4 becomes movable in the tube axis direction. The synthetic resin tube 10 can be bent at this section (refer to FIG. 5).

FIG. 6 shows a modified example of the second embodiment. In this example, projections 8 for holding the coil 6 are provided at both sides of the convex portion 7 of the external layer 3. This projections 8 are provided to ensure that the coil 6 will not fall off while the tube 10 is in use.

Also, the projections 8 in this example are to temporarily prevent the coil 6 from falling off, and the coil 6 itself is detachable with strong force. Thus, the projections 8 do not interfere with the formation of the curbed section.

Although the present invention has been described in connection with the preferred embodiments above, it is to be noted that various changes and modifications are apparent to a person skilled in the art. Such changes and modifications are to be understood as being within the scope of the present invention.

What is claimed is:

1. A synthetic resin tube comprising:
   an internal layer which is made of non-rigid synthetic resin, an inner circumferential surface of the internal layer being substantially smooth;
   an external layer which is formed by winding a rigid synthetic resin strip around an outer circumferential surface of the internal layer overlapping but not connecting winds of the strip, a cross section of the strip being S-shaped, the external layer being connected to the internal layer;
   a coil which is fitted detachably in a concave portion formed spirally in an axis direction of the synthetic resin tube at an outer surface of the external layer, the coil limiting flexibility of the synthetic resin tube by being fitted to the synthetic resin tube and providing flexibility to the synthetic resin tube by being removed.

2. A synthetic resin tube as claimed in claim 1 wherein:
   the internal layer is formed by winding an extruded non-rigid synthetic resin tape spirally and connecting side end portions to each other;
   the external layer is formed by winding a rigid synthetic resin strip which is extruded simultaneously with the non-rigid synthetic resin tape around an outer circumferential surface of the internal layer spirally and connecting the external layer to the internal layer; and
   the coil is fitted in the concave portion which is formed spirally at the outer surface of the external layer such that the coil does not adhere to the concave portion.

3. A synthetic tube as claimed in claim 1 wherein the strip has projections at both sides of a convex portion of the external layer for holding the coil in place.

4. A method of producing a synthetic resin tube comprising:
   a step of forming an internal layer by extruding a non-rigid synthetic resin tape and simultaneously winding the tape spirally, and fusing side end portions of the tape with each other;
   a step of, simultaneously with the formation of the internal layer, extruding a rigid synthetic resin strip and winding the strip spirally around an outer circumferential surface of the internal layer overlapping but not connecting winds of the strip; and
   a step of extruding and fitting synthetic resin which does not fuse with the external layer by heat in a concave portion of the external layer, simultaneously with or after the formation of the external layer.

* * * * *